United States Patent
Joo et al.

(10) Patent No.: US 10,419,429 B2
(45) Date of Patent: Sep. 17, 2019

(54) INFORMATION PROVIDING METHOD AND DEVICE FOR SHARING USER INFORMATION

(71) Applicant: Samsung Electronics Co., Ltd., Gyeonggi-do (KR)

(72) Inventors: Jae Seok Joo, Gyeonggi-do (KR); Chang Ryong Heo, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 132 days.

(21) Appl. No.: 15/390,869

(22) Filed: Dec. 27, 2016

(65) Prior Publication Data

US 2017/0187711 A1    Jun. 29, 2017

(30) Foreign Application Priority Data

Dec. 28, 2015    (KR) .......................... 10-2015-0187138

(51) Int. Cl.

| | |
|---|---|
| H04L 29/06 | (2006.01) |
| G06F 21/32 | (2013.01) |
| G06F 21/60 | (2013.01) |
| G10L 15/26 | (2006.01) |
| G10L 15/30 | (2013.01) |
| G10L 17/22 | (2013.01) |
| G06F 21/34 | (2013.01) |
| G06F 21/62 | (2013.01) |

(52) U.S. Cl.
CPC .......... *H04L 63/0861* (2013.01); *G06F 21/32* (2013.01); *G06F 21/34* (2013.01); *G06F 21/604* (2013.01); *G06F 21/629* (2013.01); *G10L 15/26* (2013.01); *G10L 15/30* (2013.01); *G10L 17/22* (2013.01); *H04L 63/105* (2013.01); *G06F 2221/2111* (2013.01)

(58) Field of Classification Search
None
See application file for complete search history.

(56) References Cited

U.S. PATENT DOCUMENTS

| | | | |
|---|---|---|---|
| 9,298,197 B2 | 3/2016 | Matsuoka et al. | |
| 2006/0178777 A1 | 8/2006 | Park et al. | |
| 2009/0106549 A1* | 4/2009 | Mohamed | G06F 21/6218 713/156 |
| 2013/0286223 A1* | 10/2013 | Latta | H04N 1/00347 348/207.1 |
| 2014/0316584 A1 | 10/2014 | Matsuoka et al. | |
| 2016/0195289 A1 | 7/2016 | Matsuoka et al. | |

* cited by examiner

*Primary Examiner* — Andrew J Steinle
(74) *Attorney, Agent, or Firm* — Cha & Reiter, LLC (57) ABSTRACT

An electronic device is provided. The electronic device includes a communication module, and a processor. The processor is configured to receive a first user context of a first user from a first user device and a second user context of a second user from a second user device via the communication module, to determine when the first user and the second user are within a specified distance, by using location information in the first and second user contexts, to set permissions to access at least a portion of the first and/or second user contexts based on the determination, to receive a request from the first user for information in the second user context, and to provide the information in the second user context to the first user when the permissions of the second user context allows the first user to access the information in the second user context.

14 Claims, 9 Drawing Sheets

INFORMATION PROVIDING METHOD AND DEVICE FOR SHARING USER INFORMATION

CLAIM OF PRIORITY

This application claims the benefit under 35 U.S.C. § 119(a) of a Korean patent application filed on Dec. 28, 2015 in the Korean Intellectual Property Office and assigned Serial number 10-2015-0187138, the entire disclosure of which is hereby incorporated by reference.

TECHNICAL FIELD

The present disclosure generally relates to an information providing method of an electronic device that is shared by a plurality of users.

BACKGROUND

With the development of electronic technologies, various types of electronic products are being developed and distributed. Such devices may include electronic devices that are intended for a plurality of users. One such example is a household robot or an office robot, such as a smart home assistant or a smart speaker.

The users may be provided with various services by using the above-described electronic devices. In particular, an electronic device such as a household robot (e.g. smart home assistant) may share user information received from family members to other family members and may hold conversations with family members.

The electronic device (e.g., a household/office robot) for a plurality of users may collect or manage information about the plurality of users. In this case, a portion of the user information managed by the electronic device may include information that the users do not want share with other members. Therefore, methods to set permissions to access the information by the plurality of user are required.

SUMMARY

Aspects of the present disclosure are to address at least the above-mentioned problems and/or disadvantages and to provide at least the advantages described below. Accordingly, an aspect of the present disclosure is to provide an information providing method and a device that can protect the private information of the plurality of users by setting permission to access the private user information stored at the electronic device.

In accordance with an aspect of the present disclosure, an electronic device may include a communication module, and a processor. The processor may be configured to: receive a first user context of a first user from a first user device and a second user context of a second user from a second user device via the communication module, determine when the first user and the second user are within a specified distance, by using location information in the first and second user contexts, set permissions to access at least a portion of the first and/or second user contexts based on the determination, receive a request from the first user for information in the second user context, and provide the information in the second user context to the first user when the permissions of the second user context allows the first user to access the information in the second user context.

In accordance with another aspect of the present disclosure, an information providing method of an electronic device may include receiving a first user context of a first user from a first user device and a second user context of a second user from a second user device; determining when the first user and the second user are within a specified distance, by using location information in the first and second user contexts; setting permissions to access at least a portion of the first and/or second user contexts based on the determination; receiving a request from the first user for information in the second user context; and providing the information in the second user context to the first user when the permissions of the second user context allows the first user to access the information in the second user context.

In accordance with another aspect of the present disclosure, there may be provided a non-transient computer-readable recording medium storing a plurality of instruction, the instructions when executed by a processor causes the processor to perform a method that includes receiving a first user context of a first user from a first user device and a second user context of a second user from a second user device; determining when the first user and the second user are within a specified distance, by using location information in the first and second user contexts; setting permissions to access at least a portion of the first and/or second user contexts based on the determination; receiving a request from the first user for information in the second user context; and providing the information in the second user context to the first user when the permissions of the second user context allows the first user to access the information in the second user context.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Hereinafter, various embodiments of the present disclosure are disclosed with reference to the accompanying drawings. However, the invention disclosed in present disclosure is not intended to be limited by the various embodiments of the present disclosure and it is intended that the present disclosure covers all modifications, equivalents, and/or alternatives of the invention disclosed present disclosure provided they come within the scope of the appended claims and their equivalents. With respect to the descriptions of the accompanying drawings, like reference numerals refer to like elements.

The term "include," "comprise," and "have," or "may include," or "may comprise," and "may have" used herein indicates disclosed functions, operations, or existence of elements but does not exclude other functions, operations or elements.

In the disclosure disclosed herein, the expressions "A or B," "at least one of A or/and B," or "one or more of A or/and B," and the like used herein may include any and all combinations of one or more of the associated listed items. For example, the term "A or B," "at least one of A and B," or "at least one of A or B" may refer to all of the case (1) where at least one A is included, the case (2) where at least one B is included, or the case (3) where both of at least one A and at least one B are included.

The terms, such as "first," "second," and the like used herein may refer to various elements of various embodiments of the present disclosure, but do not limit the elements. For example, "a first user device" and "a second user device" may indicate different user devices regardless of the order or priority thereof. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled to the other element or an intervening element (e.g., a third element) may be present between the first element and the second element. In contrast, when an element (e.g., a first element) is referred to as being "directly coupled with/to" or "directly connected to" another element (e.g., a second element), it should be understood that there are no intervening elements.

According to the situation, the expression "configured to" used herein may be used as, for example, the expression "suitable for," "having the capacity to," "designed to," "adapted to," "made to," or "capable of." The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

Figure 1:
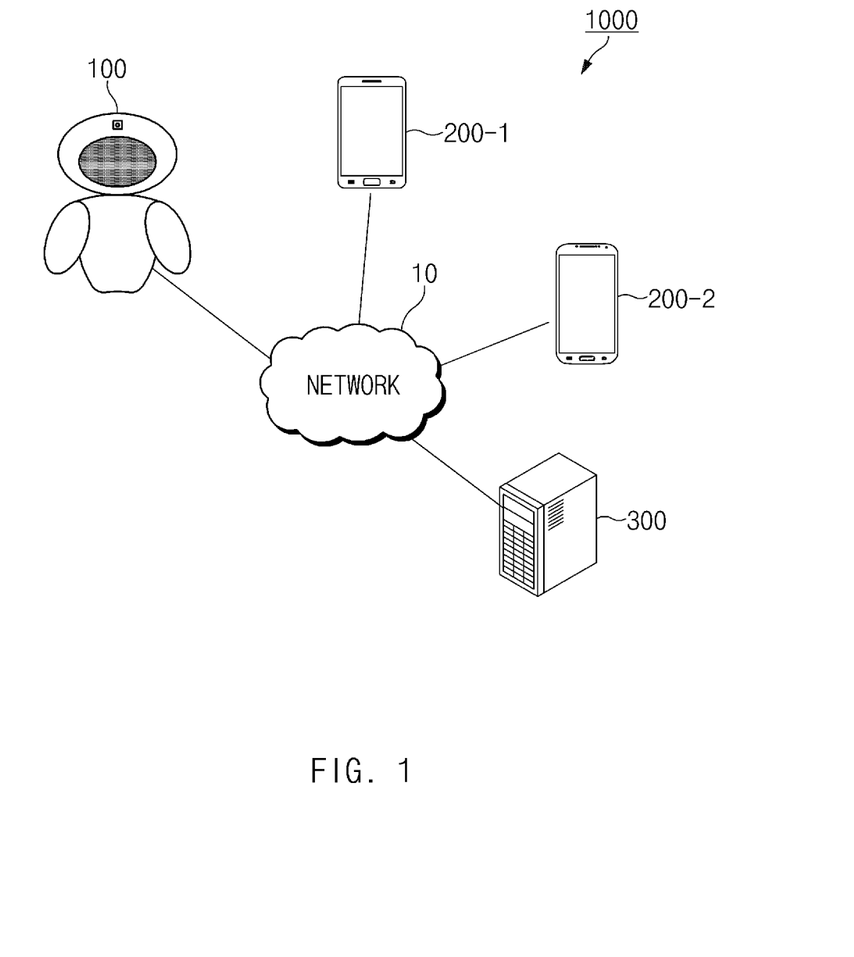
FIG. 1 is a diagram illustrating a configuration of an information providing system, according to one embodiment of the present disclosure.

FIG. 1 is a diagram illustrating a configuration of an information providing system, according to one embodiment of the present disclosure.

Referring to FIG. 1, an information providing system 1000 may include an electronic device 100, a first user device 200-1, a second user device 200-2, and a cloud server 300. According to an embodiment, the electronic device 100, the first user device 200-1, the second user device 200-2, and the cloud server 300 may be connected to each other over a network 10. For example, the electronic device 100, the first user device 200-1, and the second user device 200-2 may be connected to each other through local area network technologies such as WIRELESS FIDELITY (Wi-Fi), BLUETOOTH, NEAR FIELD COMMUNICATION (NFC), and/or other connectivity technologies. As another example, the electronic device 100, the first user device 200-1, the second user device 200-2, and the cloud server 300 may be connected to each other over a mobile communication network or an Internet network.

According to an embodiment, the electronic device 100 may be a household robot such as a smart home assistant or a smart speaker. According to an embodiment, the electronic device 100 may holds conversations with family members at home and may provide necessary information in response to queries from family members. According to an embodiment, the electronic device 100 may receive user contexts from the first user device 200-1 and the second user device 200-2. According to an embodiment, the electronic device 100 may analyze the user contexts and may set permission to access the user contexts based on the analyzed result. According to an embodiment, the electronic device 100 may provide information based on the access permission set to the user context.

According to an embodiment, the first user device 200-1 may be a user device of a first user. According to an embodiment, the second user device 200-2 may be a user device of a second user. For example, the first user device 200-1 or the second user device 200-2 may be a portable electronic device such as a smartphone, a wearable device (e.g., a smart watch or the like), a tablet PC, or the like for the first and second users, respectively. The first user device 200-1 or the second user device 200-2 may also be, for example, a head-mounted display (HMD) providing virtual reality (VR).

According to an embodiment, the first user device 200-1 may collect a user context of the first user, and the second user device 200-2 may collect a user context of the second user. According to an embodiment, the user contexts may include at least one of contents use information, a call history, a message or e-mail sending and receiving history, contents creation information, biometric information, user activity information, a purchasing history, a web surfing history, location information, a user schedule, and state information of the user device. The contents use information may include, for example, information about type, playback time, playback frequency, and/or genre of contents (e.g., music, video, e-book, TV, and the like) played by a user. The call history and the message or e-mail sending and receiving history may include times when a user makes a call and sends and receives messages, call/message frequency, counterpart contacts, and the like. The contents creation information may include, for example, information about creation time, creation place, size, sharing pattern (e.g., whether content was uploaded to a social network service (SNS)) of contents (e.g., photos, videos, and the like) that are created in a user device. The biometric information may include, for example, a heart rate, heath related information, and the like of the user. The user activity information may include, for example, information associated with physical activities of the user, for example, information about times or distances of physical activities, such as walking, jogging, sleeping, and the like. The purchasing history may include, for example, kinds, payment means, payment amounts, and payment frequencies of good and/or services purchased by the user. The web surfing history may include, for example, information about a web page that the user visits through a web browser or a search engine or information about search keywords. The location information may include, for example, locations of the user at various times, whether the user was in one or more geo-fences, and the like. The user schedule may include, for example, calendar information of the user. The state information of the user device may include, for example, use pattern of one or more applications of the user device, information regarding peripheral devices connected with the user device, environment setting information, and the like. According to an embodiment, each piece of information included in the user context may include time information (e.g., a time stamp).

According to an embodiment, each of the first user device 200-1 and the second user device 200-2 may send its user context to the electronic device 100 over the network 10. For example, each of the first user device 200-1 and the second user device 200-2 may directly send its user context to the electronic device 100 or may send its user context to the cloud server 300.

According to an embodiment, the cloud server 300 may receive user contexts from the first user device 200-1 and the second user device 200-2. According to an embodiment, the cloud server 300 may send user contexts to the electronic device 100 in response to a request of the electronic device 100.

In the embodiment described with reference to FIG. 1, the information providing system 1000 is illustrated in FIG. 1 as including two user devices (e.g., the first user device 200-1 and the second user device 200-2). However, the present disclosure is not so limited and the information providing system 1000 may include three or more user devices.

Figure 2:
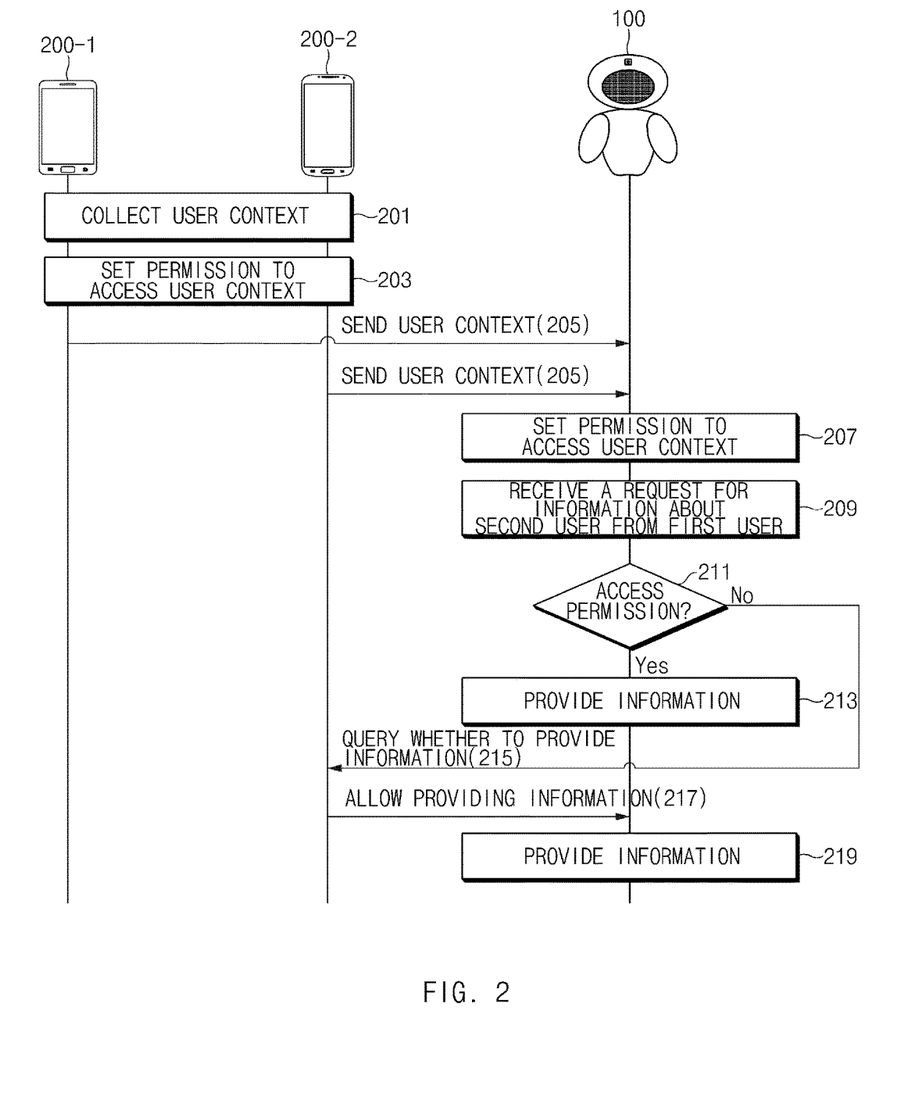
FIG. 2 is a flowchart illustrating an information providing method of the information providing system, according to one embodiment of the present disclosure.

FIG. 2 is a flowchart illustrating an information providing method of an information providing system, according to one embodiment of the present disclosure.

Referring to FIG. 2, in operation 201, the first user device 200-1 and the second user device 200-2 may collect user contexts. For example, the first user device 200-1 may collect user contexts of a first user, and the second user device 200-2 may collect user contexts of a second user.

According to an embodiment, in operation 203, each of the first user device 200-1 and the second user device 200-2 may set permission to access its user contexts. According to an embodiment, each of the first user device 200-1 and the second user device 200-2 may set permission to access a portion of its user contexts based on user input from the first user and the second user, respectively. For example, a user may restrict the access permission such that any other user is prohibited from accessing the biometric information and the purchasing history of the user context. According to an embodiment, each of the first user device 200-1 and the second user device 200-2 may set permission to access the user context that is collected at a specific time interval. According to an embodiment, if the user input for setting permission to access the user context is not received from the first and/or second user, operation 203 may be omitted.

According to an embodiment, in operation 205, each of the first user device 200-1 and the second user device 200-2 may send the user contexts to the electronic device 100. According to an embodiment, the first user device 200-1 and the second user device 200-2 may send the user contexts to the electronic device 100 if they are connected with the electronic device 100 over a local area network. According to an embodiment, each of the first user device 200-1 and the second user device 200-2 may send the user context to the electronic device 100 via an external server (e.g., the cloud server 300). For example, each of the first user device 200-1 and the second user device 200-2 may send the collected user context to the cloud server 300. The electronic device 100 may request the user contexts of the first and second users from the cloud server 300 and may receive the requested user contexts from the cloud server 300.

According to an embodiment, in operation 207, the electronic device 100 may set permissions to access the user contexts. According to an embodiment, the electronic device 100 may determine when the first user and the second user exist in the same space (e.g. in the same room), based on location information included in the user contexts. For example, if the first user and the second user are situated within a specified distance, the electronic device 100 may determine that the first user and the second user exist in the same space. As another example, if the first user and the second user are situated together at a specified place (e.g., home, workplace, a park, or the like), the electronic device 100 may determine that the first user and the second user exist in the same space. According to an embodiment, the electronic device 100 may allow the first and second users to mutually access the user contexts thereof when the first user and the second user exist in the same space and may prohibit the other party from accessing the user contexts when the first user and the second user do not exist in the same space.

According to an embodiment, in operation 209, the electronic device 100 may receive a request from the first user for information about the second user (or user context of the second user). For example, the first user may ask a location or activity of the second user.

According to an embodiment, in operation 211, the electronic device 100 may determine whether the first user has permission to access the requested information. For example, the electronic device 100 may search for information needed to respond to the question of the first user and may verify the access permissions set to the found information.

According to an embodiment, if it is determined that the first user is allowed to access the requested information, the electronic device 100 may provide the requested information to the first user.

According to an embodiment, if it is determined that the first user does not have the permissions to access the requested information, in operation 215, the electronic device 100 may ask the second user whether to provide information. For example, the electronic device 100 may send a message to the second user device 200-2, which the second user possesses, to ask whether to provide information. The second user may allow or prohibit the providing of the information by responding to the message using the second user device 200-2.

According to an embodiment, in operation 217, the second user device 200-2 may send a response message about whether to provide information to the electronic device 100, based on input from the second user. For example, the second user device 200-2 may send the response message, which allows for providing the information, to the electronic device 100.

According to an embodiment, if the response allows for providing information is received from the second user device 200-2, in operation 219, the electronic device 100 may provide the first user with the requested information.

According to an embodiment of the present invention, a household robot (e.g., the electronic device 100) may share information in user contexts received from family members and may communicate with the family members. In this case, a portion of information included in a user context may include information that the users do not want to share with other family members. According to one embodiment of the present invention, the privacy of the family members may be protected by setting permission to access the user contexts on the basis of locations of the family members at various times.

Figure 3:
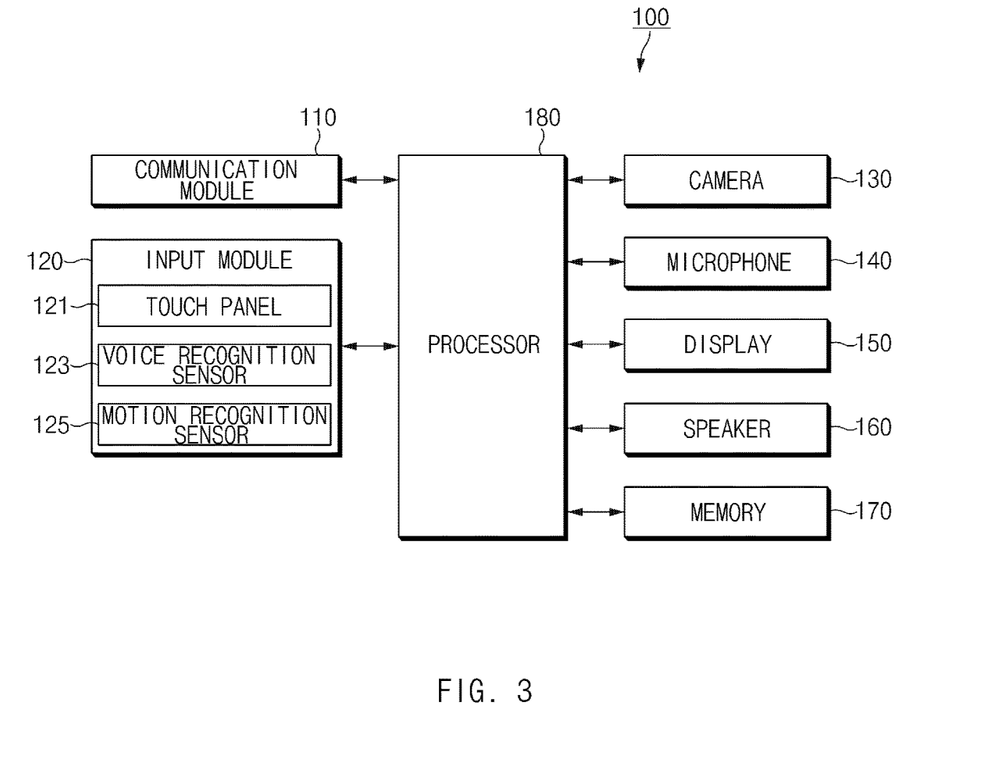
FIG. 3 is a block diagram illustrating a configuration of an electronic device, according to one embodiment of the present disclosure.

FIG. 3 is a block diagram illustrating a configuration of an electronic device, according to one embodiments of the present invention.

Referring to FIG. 3, the electronic device 100 may include a communication module 110, an input module 120, a camera 130, a microphone 140, a display 150, a speaker 160, a memory 170, and a processor 180.

The communication module 110 may communicate with the first user device 200-1, the second user device 200-2, and the cloud server 300. According to an embodiment, when the electronic device 100 is a household robot, the communication module 110 may receive user contexts of family members (e.g., the first user and the second user) from the first user device 200-1 and the second user device 200-2. According to an embodiment, the communication module 110 may include a cellular module, a WI-FI module, a BLUETOOTH module, a NEAR FIELD COMMUNICATION (NFC) module, a GLOBAL NAVIGATION SATELLITE SYSTEM (GNSS) module, and the like.

According to an embodiment, the input module 120 may receive a user input. According to an embodiment, the input module 120 may receive requests by a family member (e.g. the first user) for information in user contexts of other family members (e.g., the second user).

According to an embodiment, the input module 120 may include a touch panel 121, a voice recognition module 123, and a motion recognition sensor 125.

According to an embodiment, the touch panel 121 may sense a touch manipulation (e.g., a finger or pen manipulation) of the user. According to an embodiment, the input module 120 may sense a user manipulation that is input within a specific distance while not directly contacting the panel, as well as a user manipulation that is input when the user directly contacts the panel.

According to an embodiment, the voice recognition module 123 may recognize a user voice received through the microphone 140. According to an embodiment, the voice recognition module 123 may analyze the user voice to identify the user. For example, the voice recognition module 123 may analyze a characteristic (e.g., a voice waveform) of the user voice received through the microphone 140 and may determine whether the user voice corresponds to any one of the family members.

According to an embodiment, the voice recognition module 123 may convert the user voice into a text to generate a request from the user. For example, the voice recognition module 123 may convert a voice signal into a text by using a speech to text (STT) algorithm. According to an embodiment, the voice recognition module 123 may perform natural language understanding (NLU) and dialog management (DM) on the text to generate a query for information in the user contexts.

According to an embodiment, at least part of the above-described voice recognition process may be performed by at least one external server (e.g., a voice recognition server). For example, the processor 180 may send the voice signal to the external server and may receive the text converted from the voice signal from the external server. As another example, the processor 180 may send the text to the external server and may receive from the external server the query generated from natural language understanding (NLU) and dialog management (DM).

According to an embodiment, the motion recognition sensor 125 may recognize the user's face by using an image captured by the camera 130. The motion recognition sensor 125 may then analyze the face by using a face recognition algorithm and generate a query for information in the user contexts using the facial features recognized by the face recognition algorithm.

According to an embodiment, the voice recognition module 123 and the motion recognition sensor 125 are described as being independent of the processor 180. However, all or some of operations executed by the voice recognition module 123 and the motion recognition sensor 125 may be performed by the processor 180.

According to an embodiment, the camera 130 may capture a surrounding environment of the electronic device 100. For example, the camera 130 may capture images of the user. According to an embodiment, the camera 130 may transmit the captured images to the motion recognition sensor 125 or the processor 180.

According to an embodiment, the microphone 140 may receive sound (e.g. the user's voice) and may convert the received the sound into an electrical voice signal. According to an embodiment, the microphone 140 may transmit the electrical voice signal to the voice recognition module 123 or the processor 180.

According to an embodiment, the display 150 may display a user interface. For example, the display 150 may display queries recognized by the voice recognition module 123 and a response to the query.

According to an embodiment, the speaker 160 may output sound. For example, the processor 180 may convert an answer to a query into voice data and may output the voice data through the speaker 160.

According to an embodiment, the memory 170 may store user contexts received from the first user device 200-1 and the second user device 200-2. According to an embodiment, the memory 170 may also store the user contexts and the associated permissions.

According to an embodiment, the processor 180 may control overall operations of the electronic device 100. According to an embodiment, the processor 180 may provide information to the user by controlling the communication module 110, the camera 130, the microphone 140, the display 150, the speaker 160, and the memory 170. According to an embodiment, the processor 180 may be implemented with a system on chip (SoC) that includes at least one central processing unit (CPU), a graphic processing unit (GPU), a memory, and the like. In another embodiment, the processor 180 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. § 101 and does not constitute software per se. In addition, an artisan understands and appreciates that a "processor" or "microprocessor" constitute hardware in the claimed invention. Under the broadest reasonable interpretation, the appended claims constitute statutory subject matter in compliance with 35 U.S.C. § 101.

According to an embodiment, the processor 180 may store user contexts received from the first user device 200-1 and the second user device 200-2 in the memory 170. According to an embodiment, the processor 180 may classify and manage user contexts for respective users.

Figure 4:
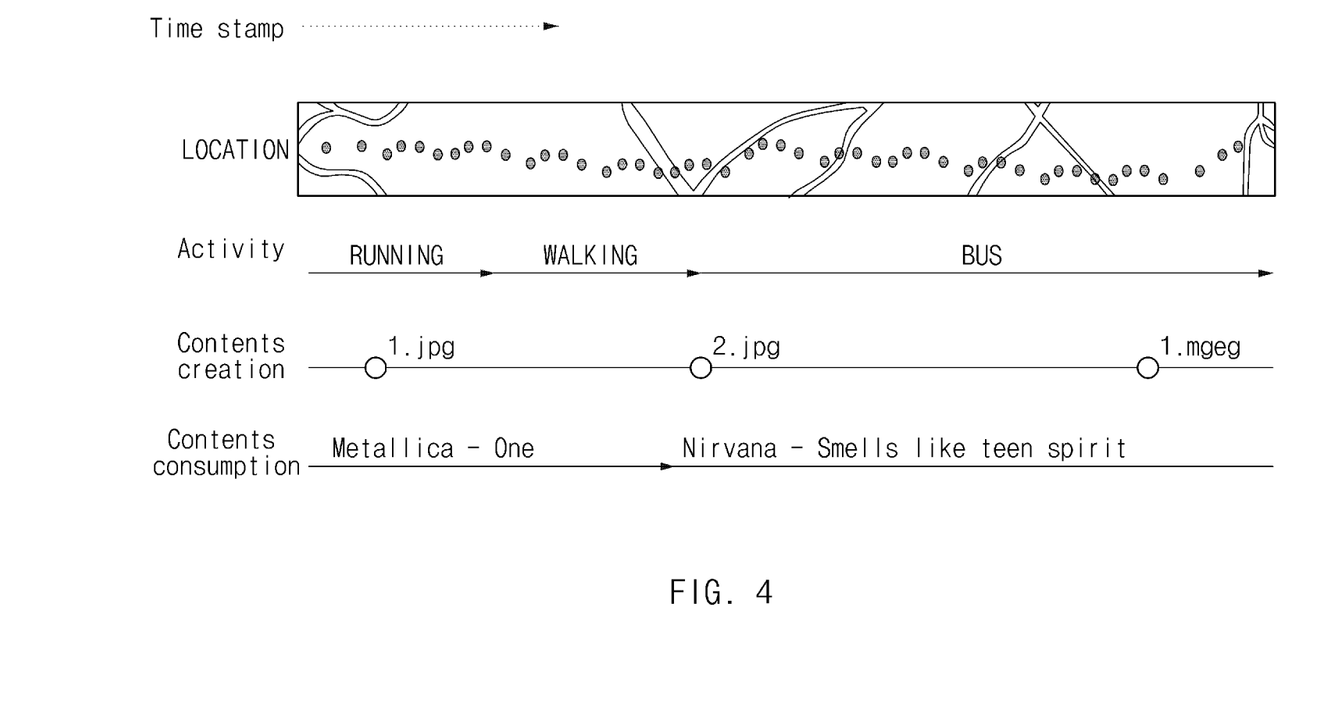
FIG. 4 is a diagram illustrating an example of a user context, according to one embodiment of the present disclosure.

FIG. 4 is a diagram illustrating an example of a user context, according to one embodiment of the present disclosure.

Referring to FIG. 4, location information, user activity, contents creation information, and contents consumption information are arranged according to time. According to an embodiment, the processor 180 may organize various kinds of user contexts collected using time information (e.g., time stamps) included in the user contexts.

According to an embodiment, the processor 180 may analyze the user contexts and may set the permissions to access the user context of each user based on the analyzed result. The processor 180 may set, for example, the access permissions to allow the user to always access his/her user context. According to an embodiment, the processor 180 may determine when the first user and the second user exist in the same space, based on location information included in the user contexts. According to an embodiment, if the first user and the second user are situated within a specified distance, the processor 180 may determine that the first user and the second user exist in the same space. For example, if the first user and the second user are situated within a distance of 100 m, the processor 180 may determine that the first user and the second user exist in the same space. According to an embodiment, if the first user and the second user are situated together at a specified place, the processor 180 may determine that the first user and the second user exist in the same space. For example, if the first user and the second user are situated together at a specific facility (e.g., a museum, a library, a swimming pool, or the like), the processor 180 may determine that the first user and the second user exist in the same space. As another example, if the first user and the second user are situated within a specified distance from a landmark (e.g., Seoul tower), the processor 180 may determine that the first user and the second user exist in the same space.

According to an embodiment, the processor 180 may set permissions to access a user context based on when the first user and the second user exist in the same space. For example, the processor 180 may allow the second user to access the user context of the first user when the first user and the second user exist in the same space and may restrict the access of the user context of the second user by the first user when the first user and the second user are not in the same space.

According to an embodiment, the processor 180 may determine a time when the first user and the second user perform on-line activity together. The on-line activity may include, for example, a voice call, a video call, a short message service (SMS), an e-mail, an SNS, an on-line game, on-line chatting, or a virtual reality (VR) service. For example, the first user and the second user may make a call to each other or may exchange messages with each other. Alternatively, the first user and the second user may play the same game while being connected to each other or may make use of a VR service in the same virtual space (e.g., the same coordinates in the virtual space) through the VR service. According to an embodiment, the processor 180 may set the access permissions to allow the first user and the second user mutually access portions of each other's user contexts associated with the on-line activity.

Figure 5:
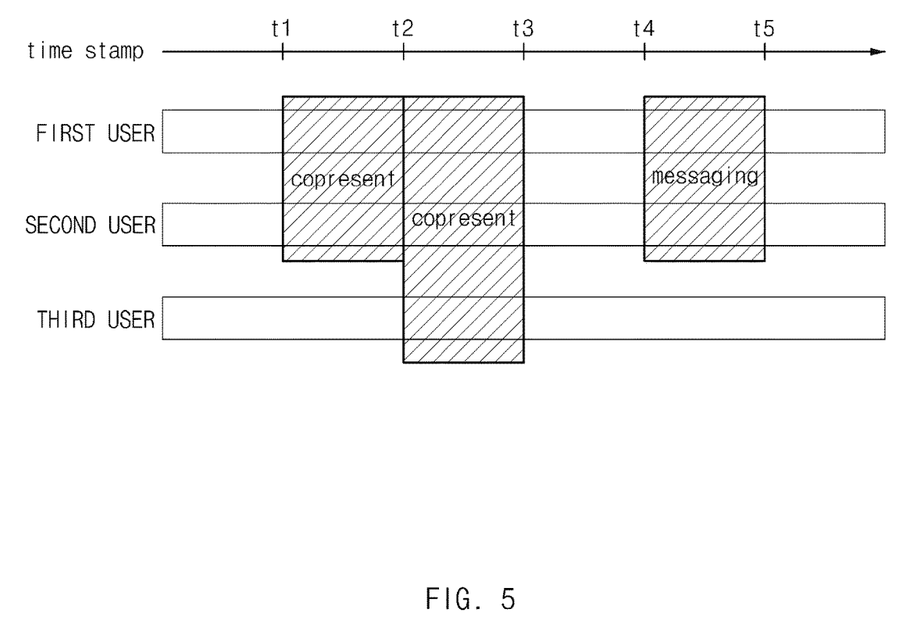
FIG. 5 is a diagram illustrating an example of setting permission to access user contexts, according to one embodiment of the present disclosure.

FIG. 5 is a diagram illustrating an example of setting permission to access user contexts according to one embodiment of the present disclosure.

Referring to FIG. 5, the processor 180 may determine that the first user and the second user were in the same space from a first time point t1 to a second time point t2. The processor 180 may determine that the first user, the second user, and a third user were in the same space from the second time point t2 to a third time point t3. For example, the processor 180 may determine that the first user and the second user exchanged messages with each other from a fourth time point t4 to a fifth time point t5.

The processor 180 may set, for example, the access permissions to allow the second user to access the first user's user context from the first time point t1 to the second time point t2. The processor 180 may set, for example, the access permissions to allow the second and third users to access the first user's user context from the second time point t2 to the third time point t3. The processor 180 may set, for example, the access permissions to allow the first user to access the second user's user context from the first time point t1 to the third time point t3. The processor 180 may set, for example, the access permissions to allow the first and third users to access the second user's user contexts from the second time point t2 to the third time point t3. The processor 180 may set, for example, the access permissions to allow the first and second users to access the third user's user context from the second time point t2 to the third time point t3. The processor 180 may set, for example, the access permissions to allow the second user to access the first user's user context from the fourth time point t4 to the fifth time point t5, because the first and second users were performing an on-line activity together. The processor 180 may also set, for example, the access permissions to allow the first user to access the second user's user context from the fourth time point t4 to the fifth time point t5, because the first and second users were performing an on-line activity together.

According to an embodiment, permissions to access at least some of user contexts received from the first user device 200-1 and the second user device 200-2 may be in advance set by the user. For example, before user contexts are sent to the electronic device 100, the user may set a specific time or a specific user which can access to a specific portion of his or her user context. According to an embodiment, the access permissions set by the user may have a priority higher than that of the access permission set by the processor 180.

According to an embodiment, the processor 180 may be received a request to provide information in the user context of the second user from the first user. For example, the first user may request or ask information in the second user's user context through voice. For example, a mother (the first user) may ask the electronic device 100 about "How was Michael's (the second user) visit to a museum yesterday evening?" or "Why is Michael (the second user) not home?"

According to an embodiment, if a request for information in the user context of the second user is received from the first user, the processor 180 may verify the access permissions set to the user context of the second user. According to an embodiment, the processor 180 may identify the first user, which requested the information, by using the voice recognition module 123 or the motion recognition sensor 125. According to an embodiment, the processor 180 may search for information needed to answer the request; if the found information is in the user context of the second user, the processor 180 may verify the access permissions set to the user context of the second user. For example, with regard to the question of "How was Michael's visit to a museum yesterday evening?", the processor 180 may search in Michaels' user context, such as places where the Michael (the second user) visited in the evening, the times when the visits took place, captured photos, and the like, and may verify the access permissions set to the found user context. As another example, with regard to the question of "Why is Michael not home?," the processor 180 may search for the current location of Michael and user activity information and may verify the access permissions set to the found user context.

According to an embodiment, if it is determined that the first user requesting the information permission to access the information, the processor 180 may provide the requested information to the first user. According to an embodiment, if it is determined that the first user does not have permission, the processor 180 may ask the second user whether to provide information. For example, the processor 180 may send a message to the second user device 200-2 to ask whether to provide information. The message that asks whether to provide information may include, for example, the request of the first user or information to be provided in response to the request to the first user. For example, the processor 180 may send, to the second user device 200-2, a message asking whether to provide information such as "May I tell mother (a first user) what was happened at the museum yesterday?" or "May I tell mother what you are doing now?" The second user may allow or prohibit providing of the information using the second user device 200-2. For example, the second user may allow or prohibit providing of the information by providing a touch input or by voice. According to an embodiment, the processor 180 may provide information to the first user based on an answer from the second user device 200-2. According to an embodiment, the processor 180 may provide information to the first user if a message allowing the providing of the information is received from the second user device 200-2. According to an embodiment, the processor 180 may not provide information to the first user if a message prohibiting providing of the information is received from the second user device 200-2. If the providing of information is prohibited, for example, the processor 180 may provide notification that information is unable to be provided to the first user, through the display 150 or the speaker 160.

According to an embodiment, at least some of operations performed by the processor 180 may be performed by an external server. For example, an operation of storing a user context, analyzing the user context to set the access permission, or searching for user-requested information to verify the access permission may be performed by the external server.

Figure 6:
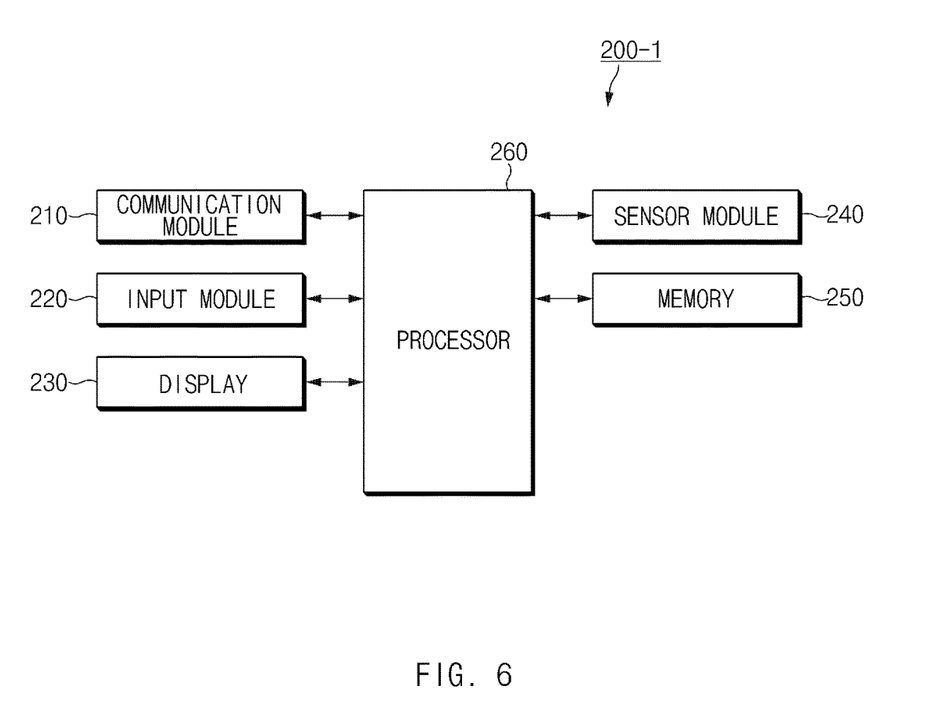
FIG. 6 is a block diagram illustrating a configuration of a first user device, according to one embodiment of the present disclosure.

FIG. 6 is a block diagram illustrating a configuration of a first user device, according to one embodiments of the present disclosure.

Referring to FIG. 6, the first user device 200-1 may include a communication module 210, an input module 220, a display 230, a sensor module 240, a memory 250, and a processor 260.

According to an embodiment, the communication module 210 may communicate with external devices (e.g., the electronic device 100 and the cloud server 300). According to an embodiment, the communication module 210 may transmit user contexts to the external devices. According to an embodiment, the communication module 210 may include a cellular module, a WI-FI module, a BLUETOOTH module, a NFC module, a GNSS module, and the like.

According to an embodiment, the input module 220 may receive a user input. According to an embodiment, the input module 220 may receive a user input for setting permission to access a user context. According to an embodiment, the input module 220 may receive a user input for restricting permission to access a user context.

According to an embodiment, the input module 220 may include a touch sensor panel that senses a touch manipulation of a user, a pen sensor panel that senses a pen manipulation of the user, a motion recognition sensor that recognizes a motion of the user, or a voice recognition sensor that recognizes a voice of the user.

According to an embodiment, the display 230 may display a user interface. For example, if a message asking whether to provide information is received from the electronic device 100, the display 230 may display contents corresponding to the received message.

According to an embodiment, the sensor module 240 may sense a state (or situation) of the first user device 200-1 or the first user. According to an embodiment, the sensor module 240 may include an acceleration sensor, a gyro sensor, a temperature/humidity sensor, or a biometric sensor.

According to an embodiment, the memory 250 may store various applications installed in the first user device 200-1. According to an embodiment, the memory 250 may store user contexts collected by the processor 260.

According to an embodiment, the processor 260 may control overall operations of the first user device 200-1. According to one embodiment, the processor 260 may collect user contexts by controlling the communication module 210, the input module 220, the display 230, the sensor module 240, and the memory 250. According to an embodiment, the processor 260 (e.g., an application processor) may be implemented with a SoC that includes at least one CPU, a GPU, a memory, and the like.

According to an embodiment, the processor 260 may collect or create user contexts based on information received from the communication module 210 or the sensor module 240 or an activity log of an application.

Figure 7:
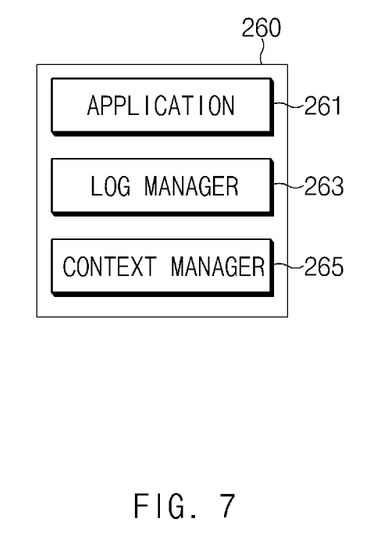
FIG. 7 is a block diagram illustrating a structure of a program module of a first user device, according to one embodiment of the present disclosure.

FIG. 7 is a block diagram illustrating a structure of a program module of a first user device, according to one embodiment of the present disclosure.

Referring to FIG. 7, the processor 260 may execute an application 261. The application 262 may be all kinds of applications capable of being installed in the first user device 220-1, such as a camera application, a message application, a call application, a web browser, a payment application, and a music/video playback application. According to an embodiment, the activity log of the application 261 may be created according to execution of the application 261.

According to an embodiment, a log manager 263 may collect activity logs created by the application 261. According to an embodiment, a context manager 265 may create user contexts based on activity logs collected by the log manager 263 and information from the communication module 210 or the sensor module 240. According to an embodiment, the context manager 265 may store the created user contexts in the memory 250. According to an embodiment, the context manager 265 may calculate meaningful data, such as an activity pattern of the user by analyzing the stored user contexts.

According to an embodiment, if a user context is requested from the electronic device 100, the processor 260 may send the requested user context to the electronic device 100. For example, if the first user device 200-1 including the processor 260 is connected with the electronic device 100 over a local area network, the processor 260 may be requested by the electronic device 100 to provide user contexts. According to an embodiment, the processor 260 may send user contexts to the cloud server 300 at a specified frequency.

Figure 8A:
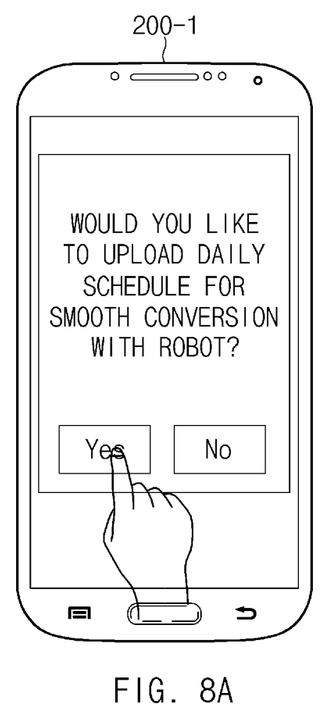
FIG. 8A and FIG. 8B are drawings illustrating user interfaces, according to one embodiment of the present disclosure.
Figure 8B:
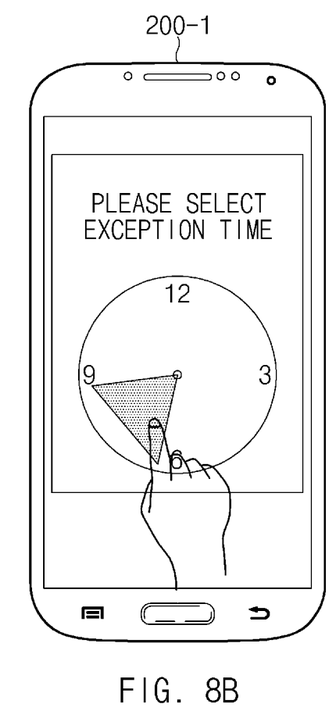

FIGS. 8A and 8B are drawings illustrating user interfaces, according to one embodiment of the present disclosure.

Referring to FIG. 8A, if a user context is requested from the electronic device 100, the first user device 200-1 (e.g., the processor 260) may display a user interface for asking whether to send the requested user context to the electronic device 100, on the display 230. According to an embodiment, if a user input allowing transmitting of the requested user context is received, the processor 260 may send the requested user context to the electronic device 100.

Referring to FIG. 8B, the processor 260 may display a user interface for selecting a transmission-limited time interval, on the display 230. According to user input on this interface, the processor 260 may send only user contexts which are collected at times other than time intervals selected by the user, to the electronic device 100.

According to an embodiment, the processor 260 may receive a message asking whether to provide information in the user context, from the electronic device 100. According to an embodiment, if a user input allowing or prohibiting providing of the information is received from the user, the processor 260 may send an answer message allowing or prohibiting the providing of the information.

The first user device 200-1 is described with reference to FIGS. 6 to 8. However, the above-described contents of the first user device 200-1 may be equally applicable to the second user device 200-2.

Figure 9:
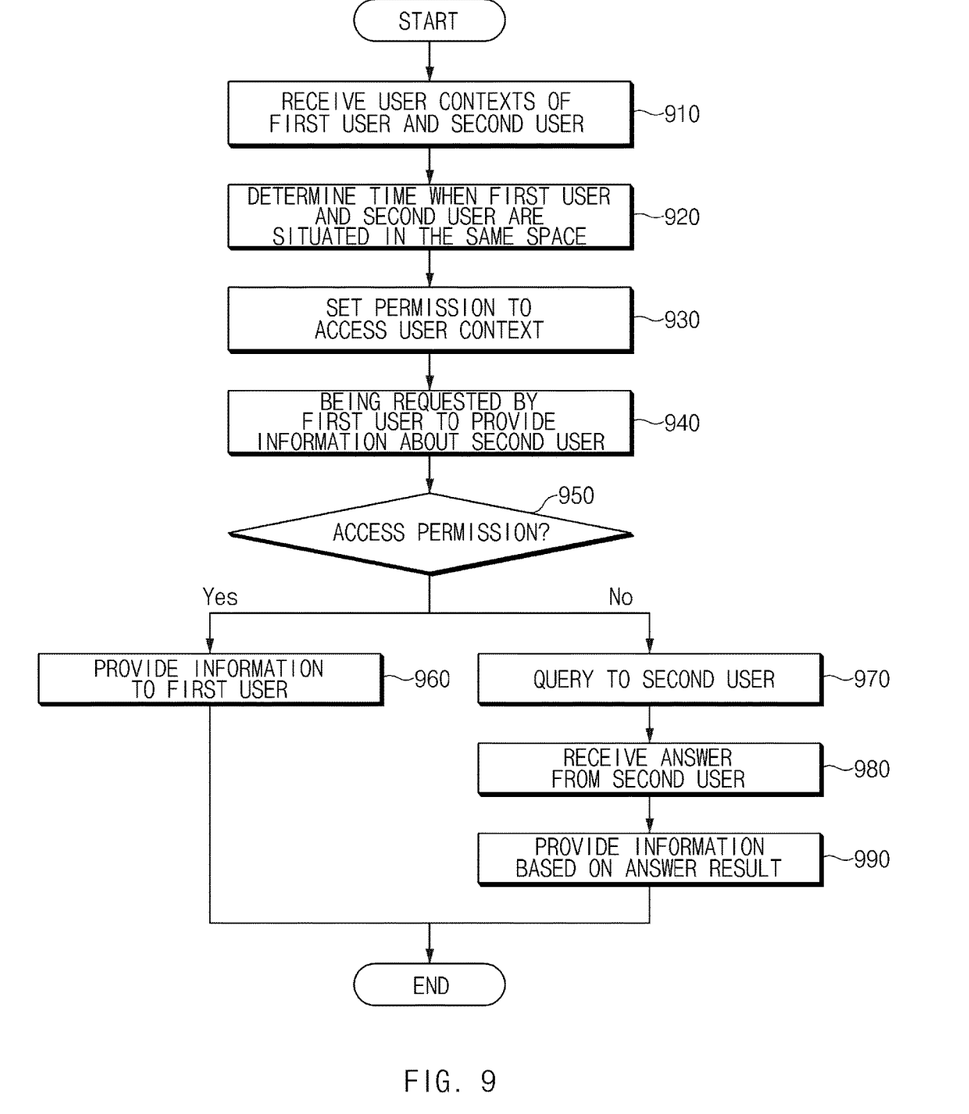
FIG. 9 is a flowchart illustrating an information providing method of an electronic device, according to one embodiment of the present disclosure.

FIG. 9 is a flowchart illustrating an information providing method of an electronic device, according to one embodiment of the present disclosure.

The flowchart illustrated in FIG. 9 may include operations which the electronic device 100 described with reference to FIG. 3 processes. Thus, even though omitted below, the description of the electronic device 100 given with reference to drawings included in this specification may be applied to the flowchart illustrated in FIG. 9.

According to an embodiment, in operation 910, the electronic device 100 may receive user contexts of the first user and the second user from the first user device 200-1 and the second user device 200-2. For example, if the electronic device 100 is connected with the first user device 200-1 and the second user device 200-2 over a local area network, the electronic device 100 may request and receive the user contexts from the first user device 200-1 and the second user device 200-2. As another example, the electronic device 100 may request and receive the user contexts of the first and second users from the cloud server 300 at specified frequencies.

According to an embodiment, in operation 920, the electronic device 100 may determine when the first user and the second user exist in the same space based on location information included in the user contexts. According to an embodiment, if the first user and the second user are situated within a specified distance, the electronic device 100 may determine that the first user and the second user exist in the same space. According to an embodiment, if the first user and the second user are situated together at a specified place, the electronic device 100 may determine that the first user and the second user exist in the same space.

According to an embodiment, in operation 930, the electronic device 100 may set permissions to access the user contexts based on when the first user and the second user exist in the same space. For example, the electronic device 100 may allow the second user to access the first user's user context, when the first user and the second user exist in the same space. Alternatively, the electronic device 100 may restrict access of the first user's user context by the second user, when the first user and the second user do not exist in the same space.

According to an embodiment, the electronic device 100 may set permissions to access a user context based on an on-line activity that the first user and the second user perform together. For example, the electronic device 100 may set the access permissions to allow the first user and the second user mutually access user contexts associated with the on-line activity that the first user and the second user perform together.

According to an embodiment, permission to access at least some of user contexts received from the first user device 200-1 and the second user device 200-2 may be in advance set by the user. According to an embodiment, the access permission set by the user may have a priority higher than that of the access permission set by the electronic device 100.

According to an embodiment, in operation 940, the electronic device 100 may be requested by the first user to provide information in the user context of the second user.

According to an embodiment, if information associated with the user context of the second user is requested from the first user, the electronic device 100 may verify the access permissions set to the user context of the second user. According to an embodiment, the electronic device 100 may search for information needed to respond to the request of the first user; if the found information is in the user context of the second user, the electronic device 100 may verify the access permissions set to the user context of the second user.

According to an embodiment, if it is determined that the first user has permission to access the information, in operation 960, the electronic device 100 may provide the requested information to the first user.

According to an embodiment, if it is determined that the first user does not have permission, in operation 970, the electronic device 100 may ask the second user by sending a message to second user device 200-2 whether to provide information.

According to an embodiment, in operation 980, the electronic device 100 may receive an answer indicating whether to provide information from the second user. For example, the electronic device 100 may receive an answer message indicating whether to provide the information from the second user device 200-2.

According to an embodiment, in operation 990, the electronic device 100 may provide the information to the first user based on the answer result. For example, the electronic device 100 may provide the requested information to the first user if a message allowing providing of information is received from the second user device 200-2. As another example, the electronic device 100 may not provide information to the first user if a message prohibiting providing of information is received from the second user device 200-2. If the providing of information is prohibited, for example, the electronic device 100 may provide notification to the first user that information is unable to be provided through a display or a speaker of the electronic device 100.

At least part of a device (e.g., modules or functions thereof) or a method (e.g., operations) according to various embodiments may be, for example, implemented by instructions stored in a computer-readable storage medium in the form of a program module. The instructions, when executed by one or more processors (e.g., the processor 180), may cause the one or more processors to perform a function corresponding to the instructions. The computer-readable storage medium, for example, may be a memory (e.g., the memory 170).

A computer-readable recording medium may include a hard disk, a floppy disk, a magnetic media (e.g., a magnetic tape), an optical media (e.g., a compact disc read only memory (CD-ROM), a digital versatile disc (DVD), or a magneto-optical media (e.g., a floptical disk)), and a hardware device (e.g., a read only memory (ROM), a random access memory (RAM), or a flash memory). Also, a program instruction may include not only a mechanical code such as things generated by a compiler but also a high-level language code executable on a computer using an interpreter. The above-mentioned hardware device may be configured to operate as one or more software modules to perform operations according to various embodiments of the present disclosure, and vice versa.

Modules or program modules according to various embodiments of the present disclosure may include at least one or more of the above-mentioned components, some of the above-mentioned components may be omitted, or other additional components may be further included therein. Operations executed by modules, program modules, or other elements may be executed by a successive method, a parallel method, a repeated method, or a heuristic method. Also, some of operations may be executed in different sequences, omitted, or other operations may be added. While the present disclosure has been shown and described with reference to various embodiments thereof, It will be understood by those skilled in the art that various changes in form and details may be made therein without departing from the spirit and scope of the present disclosure as defined by the appended claims and their equivalents.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    a communication module; and
    a memory configured to store instructions; and
    a processor configured to execute the instructions, the instructions when executed configured to:
        receive a first user context of a first user from a first user device and a second user context of a second user from a second user device via the communication module,
        determine when the first user and the second user are within a specified distance, by using location information in the first and second user contexts,
        set permissions to access at least a portion of the first and/or second user contexts based on the determination,
        set the permissions to allow the first user to access a portion of the second user context associated with an on-line activity performed by the first user and the second user,
        receive a request for information in the second user context through conversations with first user, search for information in the second user context needed to respond to the request from the first user, verify access permissions set to the searched information in the second user context, and provide the searched information in the second user context to the first user when the permissions of the second user context allows the first user to access the searched information in the second user context, wherein the user contexts comprise contents use information, a call history, a message or e-mail sending and receiving history, contents creation information, biometric information, user activity information, a purchasing history, a web surfing history, location information, a user schedule, and state information of user device, and wherein access permissions for a portion of information included in the second user contexts is in advance set by the second user.

2. The electronic device of claim 1, wherein the processor is further configured to:

set the permissions to allow the first user to access the second user context when the first user and the second user are within the specified distance, and set the permissions to restrict access of the second user context by the first user when the first user and the second user are outside the specified distance.

3. The electronic device of claim 1, wherein the electronic device further comprises a voice recognition module and the processor is further configured to identify the request as being from the first user using the voice recognition module.

4. The electronic device of claim 1, wherein the on-line activity comprises at least one of a voice call, a video call, a short message service (SMS), an e-mail, a social network service (SNS), an on-line game, on-line chatting, or a virtual reality (VR) service.

5. The electronic device of claim 1, wherein the processor is further configured to:

when the permissions of the second user context restricts access of the information by the first user or when the permissions associated with the information in the second user context is not set, transmit a query to the second user device to ask the second user whether to allow access of the information in the second user context by the first user, and provide the information to the first user if the second user allows access.

6. The electronic device of claim 1, wherein the processor is further configured to request the first and second user contexts from the first user device and the second user device when the electronic device is connected with the first and second user devices over a local area network.

7. An information providing method of an electronic device, the method comprising:

receiving a first user context of a first user from a first user device and a second user context of a second user from a second user device;

determining when the first user and the second user are within a specified distance, by using location information in the first and second user contexts;

setting permissions to access at least a portion of the first and/or second user contexts based on the determination;

receiving a request for information in the second user context through conversations with first user;

searching for information in the second user context needed to respond to the request from the first user;

verifying access permissions set to the searched information in the second user context; and providing the searched information in the second user context to the first user when the permissions of the second user context allows the first user to access the searched information in the second user context, wherein setting the permissions comprises setting the permissions to allow the first user to access a portion of the second user context associated with an on-line activity performed by the first user and the second user, wherein the user contexts comprise at least one of contents use information, a call history, a message or e-mail sending and receiving history, contents creation information, biometric information, user activity information, a purchasing history, a web surfing history, location information, a user schedule, and state information of the first or second user device, and wherein access permissions for a portion of information included in the second user contexts is in advance set by the second user.

8. The method of claim 7, wherein setting the permissions comprises:

setting the permissions to allow the first user to access the second user context when the first user and the second user are within the specified distance; and setting the permissions to restrict access of the second user context by the first user when the first user and the second user are outside the specified distance.

9. The method of claim 7, further comprising identifying the request as being from the first user using a voice recognition module of the electronic device.

10. The method of claim 7, wherein the on-line activity comprises at least one of a voice call, a video call, an SMS, an e-mail, a SNS, an on-line game, on-line chatting, or a VR service.

11. The method of claim 7, further comprising:

when the permissions of the second user context restricts access of the information by the first user or when the permissions associated with the information in the second user context is not set, transmitting a query to the second user device to ask the second user whether to allow access of the information in the second user context by the first user;

receiving a response allowing access of the information from the second user; and providing the requested information to the first user.

12. The method of claim 7, wherein receiving the first and second user contexts comprises:

connecting to the first user device and the second user device over a local area network;

requesting the first and second user contexts from the first user device and the second user device; and receiving the first and second user contexts of the first user and the second user from the first user device and the second user device.

13. A non transitory computer-readable recording medium storing a plurality of instruction, the instructions when executed by a processor causes the processor to perform a method comprising:

receiving a first user context of a first user from a first user device and a second user context of a second user from a second user device;

determining when the first user and the second user are within a specified distance, by using location information in the first and second user contexts;

setting permissions to access at least a portion of the first and/or second user contexts based on the determination;

receiving a request for information in the second user context through conversations with first user;

searching for information in the second user context needed to respond to the request from the first user;

verifying access permissions set to the searched information in the second user context; and providing the information in the second user context to the first user when the permissions of the second user context allows the first user to access the information in the second user context, wherein setting the permissions comprises setting the permissions to allow the first user to access a portion of the second user context associated with an on-line activity performed by the first user and the second user, wherein the user contexts comprise at least one of contents use information, a call history, a message or e-mail sending and receiving history, contents creation information, biometric information, user activity information, a purchasing history, a web surfing history, location information, a user schedule, and state information of the first or second user device, and wherein access permissions for a portion of information included in the second user contexts is in advance set by the second user.

14. The non transitory computer-readable recording medium of claim 13, wherein setting the permissions comprises:

determining that the first user has permission to access the second user context when the first user and the second user are within the specified distance; and determining that the first user has no permission to access the second user context when the first user and the second user are outside the specified distance.

* * * * *